(12) United States Patent
Zhang et al.

(10) Patent No.: US 8,401,107 B2
(45) Date of Patent: Mar. 19, 2013

(54) TRANSMIT METHODS WITH DELAY DIVERSITY AND SPACE-FREQUENCY DIVERSITY

(75) Inventors: Jianzhong Zhang, Irving, TX (US); Cornelius Van Rensburg, Dallas, TX (US); Farooq Khan, Allen, TX (US); Yinong Ding, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/448,090

(22) Filed: Apr. 16, 2012

(65) Prior Publication Data

US 2012/0201329 A1 Aug. 9, 2012

Related U.S. Application Data

(63) Continuation of application No. 12/155,319, filed on Jun. 2, 2008, now Pat. No. 8,160,177.

(60) Provisional application No. 60/929,376, filed on Jun. 27, 2007.

(51) Int. Cl.
*H04B 7/02* (2006.01)
*H04B 7/06* (2006.01)
*H04B 7/08* (2006.01)
*H04L 27/26* (2006.01)
*H04L 1/02* (2006.01)

(52) U.S. Cl. .......... 375/267; 375/299; 375/347; 455/99; 455/101

(58) Field of Classification Search .......... 375/260, 375/267, 295, 299, 316, 347, 358; 455/91, 455/101, 130, 132; 370/203, 210
See application file for complete search history.

(56) References Cited

U.S. PATENT DOCUMENTS

| 6,510,173 | B1 | 1/2003 | Garmonov et al. | |
|---|---|---|---|---|
| 2004/0264585 | A1 | 12/2004 | Borran et al. | |
| 2005/0254592 | A1 | 11/2005 | Naguib et al. | |
| 2006/0098568 | A1 | 5/2006 | Oh et al. | |
| 2007/0217539 | A1 | 9/2007 | Ihm et al. | |
| 2007/0274411 | A1* | 11/2007 | Lee et al. | 375/267 |
| 2008/0089442 | A1 | 4/2008 | Lee et al. | |
| 2010/0027697 | A1 | 2/2010 | Malladi et al. | |

FOREIGN PATENT DOCUMENTS

| EP | 1 648 097 A2 | 4/2006 |
|---|---|---|
| KR | 2006-0032765 | 4/2006 |
| RU | 2145152 C1 | 1/2000 |

(Continued)

OTHER PUBLICATIONS

"3GPP TS 36.211 v1.1.0,"3rd Generation Partnership Project; Technical Specification Group Radio Access Network; Physical Channels and Modulation (Release 8), May 2007, 4 pages.

(Continued)

*Primary Examiner* — Tesfaldet Bocure

(57) ABSTRACT

In this invention, several open-loop solutions that encompass the small delay CDD codeword cycling, codeword cycling between different re-transmissions of both small and large delay CDD are proposed. In addition, an open-loop codeword cycling method for SFBC+FSTD scheme, as well as its extension to SFBC+FSTD based HARQ, are proposed. In one method, a plurality of information bits are encoded, scrambled and modulated to generate a plurality of modulation symbols. The plurality of modulation symbols are mapped onto the subcarriers in at least one transmission layer of a transmission resource. The modulation symbols are then precoded by using a matrix for cyclic delay diversity and a set of codewords from a certain codebook to generate a plurality of precoded symbols. The codewords are cycled for every a certain number of subcarriers. Finally, the precoded symbols are transmitted via a plurality of transmission antennas.

20 Claims, 13 Drawing Sheets

FOREIGN PATENT DOCUMENTS

| | | |
|---|---|---|
| RU | 2314651 C2 | 1/2008 |
| WO | WO 2005/117321 A1 | 12/2005 |
| WO | WO 2007/024935 A2 | 3/2007 |
| WO | WO 2008/100038 A2 | 8/2008 |

OTHER PUBLICATIONS

"CDD-based Precoding for E-UTRA downlink MIMO", 3GPP TSG RAN WG1 Meeting #47, LG Electronics, Samsung, NTT-DoCoMo, Nov. 6-10, 2006, 6 pages.

"CDD Precoding for 4Tx Antennas", 3GPP TSG-RAN WG1 #49, Qualcomm Europe, May 7-11, 2007, 11 pages.

Byoung-Hoon Kim, "Codeword Scrambling for Multi-Stream Transmission in MIMO Channel", Vehicular Technology Conference, 2005. VTC 2005-Spring, 2005 JEEE 61st, Publication Date: Jun. 30, 2005, vol. 2, pp. 864-868, ISSN: 1550-2252, isbn: 0-7803-8887-9, http://ieeexplore.ieee.org/stamp.jsp?arnumber=01543428 abstract, p. 864 right-hand col., p. 866 left hand col. 1st paragraph-right-hand col. last paragraph, Fig. 1.

International Search Report dated Dec. 24, 2008 in Applicant's corresponding International Application No. PCT/KR2008/003646.

* cited by examiner

Distributed subcarrier Allocation for Frequency diversity in OFDM

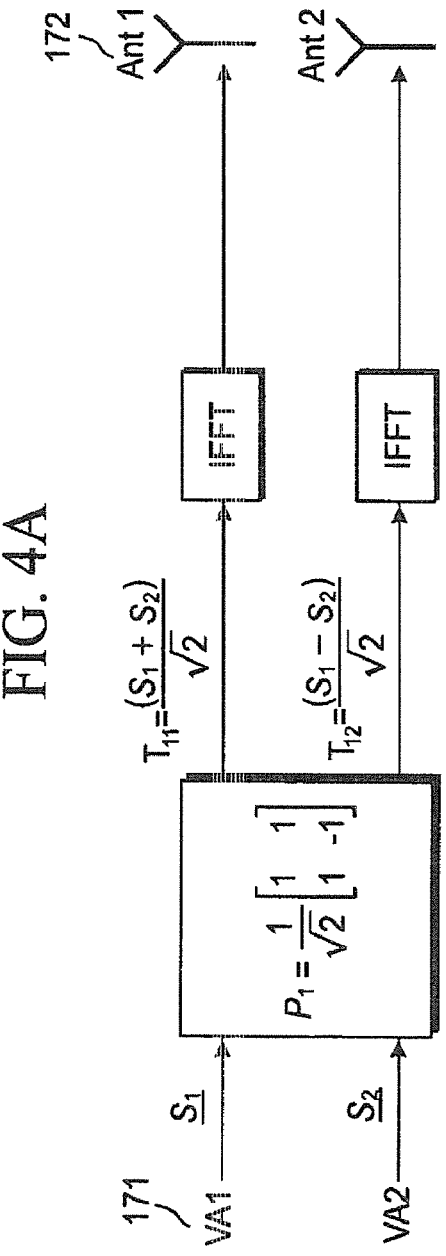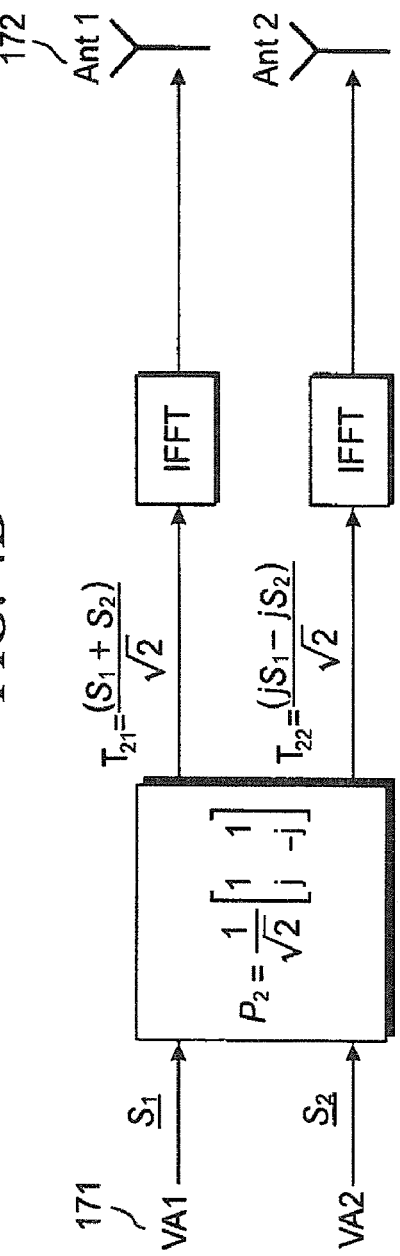

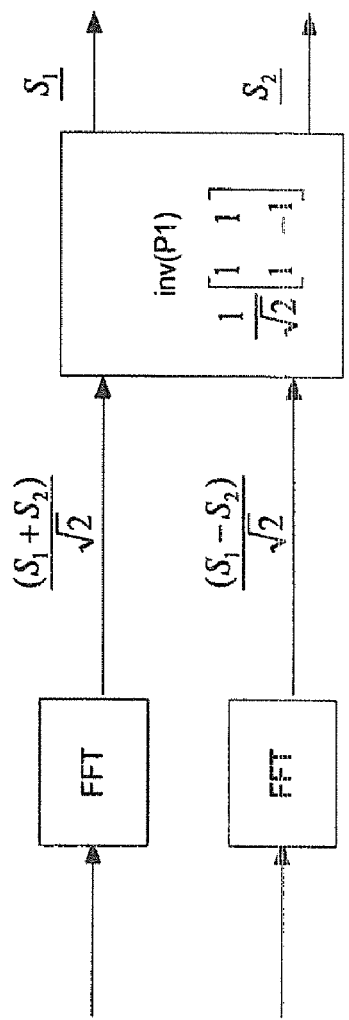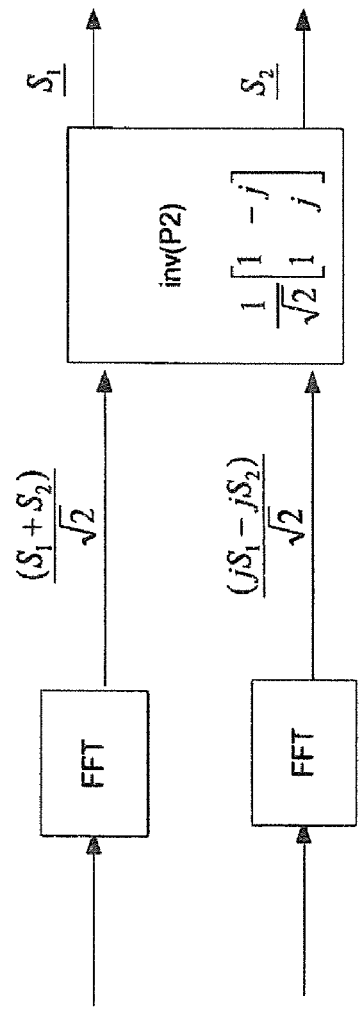

| Subcarriers | f1 | f2 | f3 | f4 | f5 | f6 | f7 | f8 |
|---|---|---|---|---|---|---|---|---|
| ANT0 | $S_1$ | $S_2$ | | | | | $S_3$ | $S_4$ |
| ANT1 | $-S_2^*$ | $S_1^*$ | | | | | $-S_4^*$ | $S_3^*$ |
| ANT2 | | | $S_3$ | $S_4$ | $S_1$ | $S_2$ | | |
| ANT3 | | | $-S_4^*$ | $S_3^*$ | $-S_2^*$ | $S_1^*$ | | |

First transmission: f1–f4
Repetition: f5–f8

FIG. 11

TRANSMIT METHODS WITH DELAY DIVERSITY AND SPACE-FREQUENCY DIVERSITY

CLAIM OF PRIORITY

This application is a continuation of U.S. patent application Ser. No. 12/155,319 filed Jun. 2, 2008 and entitled TRANSMIT METHODS WITH DELAY DIVERSITY AND SPACE-FREQUENCY DIVERSITY, now U.S. Pat. No. 8,160,177. This application also claims priority to U.S. Provisional Patent Application Ser. No. 60/929,376 filed on Jun. 27, 2007. The content of the above-identified patent documents are hereby incorporated by reference in their entirety.

BACKGROUND OF THE INVENTION

1. Field of the Invention

The present invention relates to methods to transmit signal by using delay diversity and space frequency diversity.

2. Description of the Related Art

This application, pursuant to 37 C.F.R. §1.57, incorporates by reference the following publications, copies of same material are annexed to this specification, and which are made a part of this application:
[1]. 3GPP RAN1 contribution R1-072461, "High Delay CDD in Rank Adapted Spatial Multiplexing Mode for LIE DL", May 2007, Kobe, Japan;
[2]. 3GPP RAN1 contribution R1-072019, "CDD precoding for 4 Tx antennas", May 2007, Kobe, Japan;
[3]. 3GPP TS 36.211, "Physical Channels and Modulation", v 1.1.0;
[4]. U.S. Provisional Patent Application Ser. No. 60/929,027 filed on 6 Jun., 2007, "CDD Precoding for open-loop SU MIMO";
[5]. 3GPP RAN1 contribution R1-073096, "Text Proposal for 36.211 regarding CDD Design", June 2007, Orlando, USA; and
[6]. 3GPP TS 36.211, "Physical Channels and Modulation", v 8.2.0.

A typical cellular radio system includes a number of fixed base stations and a number of mobile stations. Each base station covers a geographical area, which is defined as a cell.

Typically, a non-line-of-sight (NLOS) radio propagation path exists between a base station and a mobile station due to natural and man-made objects disposed between the base station and the mobile station. As a consequence, radio waves propagate while experiencing reflections, diffractions and scattering. The radio wave which arrives at the antenna of the mobile station in a downlink direction, or at the antenna of the base station in an uplink direction, experiences constructive and destructive additions because of different phases of individual waves generated due to the reflections, diffractions, scattering and out-of-phase recombination. This is due to the fact that, at high carrier frequencies typically used in a contemporary cellular wireless communication, small changes in differential propagation delays introduces large changes in the phases of the individual waves. If the mobile station is moving or there are changes in the scattering environment, then the spatial variations in the amplitude and phase of the composite received signal will manifest themselves as the time variations known as Rayleigh fading or fast fading attributable to multipath reception. The time-varying nature of the wireless channel require very high signal-to-noise ratio (SNR) in order to provide desired bit error or packet error reliability.

The scheme of diversity is widely used to combat the effect of fast fading by providing a receiver with multiple faded replicas of the same information-bearing signal.

The schemes of diversity in general fall into the following categories: space, angle, polarization, field, frequency, time and multipath diversity. Space diversity can be achieved by using multiple transmit or receive antennas. The spatial separation between the multiple antennas is chosen so that the diversity branches, i.e., the signals transmitted from the multiple antennas, experience fading with little or no correlation. Transmit diversity, which is one type of space diversity, uses multiple transmission antennas to provide the receiver with multiple uncorrelated replicas of the same signal. Transmission diversity schemes can further be divided into open loop transmit diversity and closed-loop transmission diversity schemes. In the open loop transmit diversity approach no feedback is required from the receiver. In one type of closed loop transmit diversity, a receiver knows an arrangement of transmission antennas, computes a phase and amplitude adjustment that should be applied at the transmitter antennas in order to maximize a power of the signal received at the receiver. In another arrangement of closed loop transmit diversity referred to as selection transmit diversity (STD), the receiver provides feedback information to the transmitter regarding which antenna(s) to be used for transmission.

Cyclic Delay Diversity (CDD) is a diversity scheme used in OFDM-based telecommunication systems, transforming spatial diversity into frequency diversity avoiding inter symbol interference.

The 3rd Generation Partnership Project (3GPP) contribution R1-072633, TS 36.211 version 1.1.0, proposed a CDD precoder structure that requires a Precoder Matrix Indication (PMI) feedback. Also, in the CDD described in TS 36.211 version 1.1.0, the open loop (i.e., large delay) and closed loop (i.e., small delay CDD) structures are different. It would be better to have one structure for both open loop and closed loop, by using different values of the precoder. The two structures are identical for the full rank cases and where the precoder matrix is an identity matrix. The closed loop structure has no solution for the case where no PMI is available for the less than full rank case. In the U.S. provisional application 60/929,027 filed on 8 Jun. 2007, entitled "CDD precoding for open-loop SU MIMO", an open-loop solution is proposed for improving the large delay CDD scheme in the high speed scenarios.

SUMMARY OF THE INVENTION

It is therefore an object of the present invention to provide improved methods and apparatus for transmitting signals.

It is another object of the present invention to provide an improved open loop precoder that can be applied to both large delay CDD and small delay CDD diversity schemes during transmission.

According to one aspect of the present invention, a plurality of information bits are encoded, scrambled and modulated to generate a plurality of modulation symbols. The plurality of modulation symbols are mapped onto the subcarriers in at least one transmission layer of a transmission resource. The modulation symbols are then precoded by using a matrix for cyclic delay diversity and a set of codewords from a certain codebook to generate a plurality of precoded symbols. The codewords are cycled for every a certain number of subcarriers. Finally, the precoded symbols are transmitted via a plurality of transmission antennas.

For large delay CDD, the precoded symbols corresponding to the i-th subcarrier is:

$$y(i)=W(i)\cdot D(i)\cdot U\cdot x(i),$$

where x(i) is a block of modulation symbols corresponding to the i-th subcarrier and $x(i)=[x^{(0)}(i) \ldots x^{(\upsilon-1)}(i)]^T$, $\upsilon$ is the number of transmission layers, U is a certain fixed matrix and the elements of U being established by $U_{mn}=e^{-j2\pi mn/\upsilon}$ for m=0, 1, ..., $\upsilon$−1, and n=0, 1, ..., $\upsilon$−1, and D(i) is a diagonal matrix for supporting large delay cyclic delay diversity.

For small delay CDD, the precoded symbols corresponding to the i-th subcarrier is:

$$y(i)=D(i)\cdot W(i)\cdot x(i),$$

where D(i) is a diagonal matrix for supporting small delay cyclic delay diversity.

For both small delay CDD and large delay CDD, the precoded symbols corresponding to the i-th subcarrier is:

$$y(i)=D(i)\cdot W(i)\cdot C(i)\cdot x(i),$$

where D(i) is a first diagonal matrix for supporting small delay cyclic delay diversity, and C(i) is a second diagonal matrix for supporting large delay cyclic delay diversity.

The value q may be equal to 1, or may be equal to the transmission rank, or may be equal to 12 m, where m is a positive integer.

The set of code words may include all of the codewords in the certain codebook. Alternatively, the set of code words may include a subset of codewords in the certain codebook.

According to another aspect of the present invention, a plurality of information bits are encoded, scrambled and modulated to generate a plurality of modulation symbols. The plurality of modulation symbols are mapped onto the subcarriers in at least one transmission layer of a transmission resource. The mapped symbols are repeatedly precoded and transmitted via a plurality of antennas by using a matrix for cyclic delay diversity and applying different codewords for different retransmissions.

According to yet another aspect of the present invention, four symbols to be transmitted are encoded by using a rank-2 space frequency block code to generate a rank-2 space frequency block of symbols. Then, the block of symbols are precoded by using a matrix for cyclic delay diversity and a set of codewords from a certain codebook to generate a plurality of precoded symbols. The codewords cycled for every a certain number of subcarriers. Finally, the precoded symbols are transmitted via a plurality of antennas.

According to still yet another aspect of the present invention, four symbols to be transmitted are encoded by using a rank-2 space frequency block code to generate a rank-2 space frequency block of symbols. The block of symbols are repeatedly precoded and transmitted via a plurality of antennas by using a matrix for cyclic delay diversity and applying different codewords for different retransmissions.

According to a further aspect of the present invention, four symbols to be transmitted are encoded to generate two transmission matrices. The two transmission matrices $T_1$ and $T_2$ are:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix}, \text{ and}$$

$$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} 0 & 0 & S_3 & S_4 \\ 0 & 0 & -S_4^* & S_3^* \\ S_1 & S_2 & 0 & 0 \\ -S_2^* & S_1^* & 0 & 0 \end{bmatrix},$$

where $T_{ij}$ represents the symbol to be transmitted on the ith antenna and the jth subcarrier. The four symbols are repeatedly transmitted via four antennas by alternatively applying the two transmission matrices $T_1$ and $T_2$ in a frequency domain.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein:

FIG. 4 schematically illustrates a precoding scheme is a MIMO system;

FIG. 5 schematically illustrates a scheme for processing precoded signals at a receiver;

FIG. 11 schematically illustrates mapping of symbols to antennas for a Space Frequency Block Code (SFBC) combined with frequency Switched Transmit Diversity (FSTD) scheme as still another embodiment according to the principles of the present invention.

DETAILED DESCRIPTION OF THE EMBODIMENTS

Figure 1:
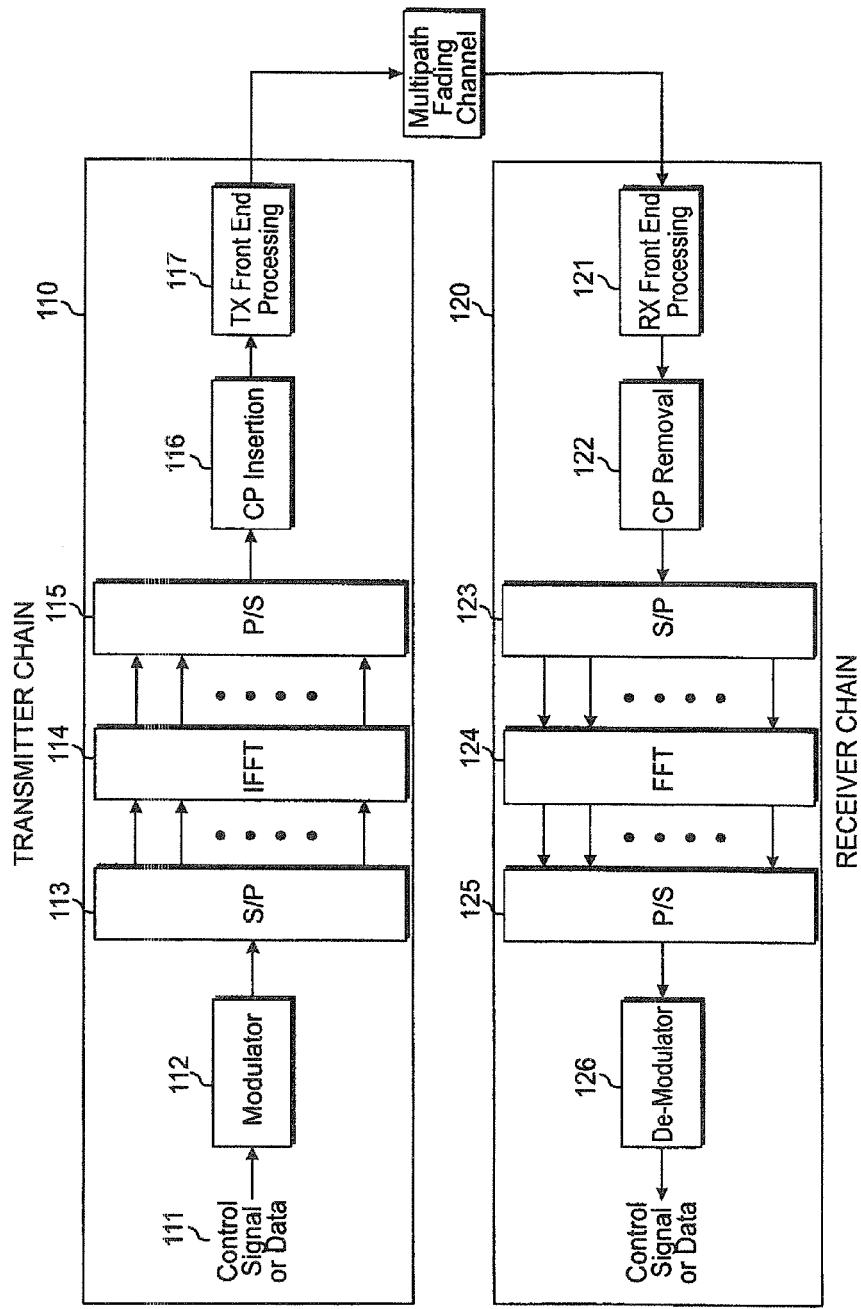
FIG. 1 schematically illustrates an Orthogonal Frequency Division Multiplexing (OFDM) transceiver chain suitable for the practice of the principles of the present invention.

FIG. 1 illustrates an Orthogonal Frequency Division Multiplexing (OFDM) transceiver chain. In a communication system using OFDM technology, at transmitter chain 110, control signals or data 111 is modulated by modulator 112 into a series of modulation symbols, that are subsequently serial-to-parallel converted by Serial/Parallel (S/P) converter 113. Inverse Fast Fourier Transform (IFFT) unit 114 is used to transfer the signals from frequency domain to time domain into a plurality of OFDM symbols. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the OFDM system. In general, the number of subcarriers used for data is less than N because some subcarriers at the edge of the frequency spectrum are reserved as guard subcarriers. In general, no information is transmitted on guard subcarriers.

In a communication link, a multi-path channel results in a frequency-selective fading. Moreover, in a mobile wireless environment, the channel also results in a time-varying fading. Therefore, in a wireless mobile system employing OFDM based access, the overall system performance and efficiency can be improved by using, in addition to time-domain scheduling, frequency-selective multi-user scheduling. In a time-varying frequency-selective mobile wireless channel, it is also possible to improve the reliability of the channel by spreading and/or coding the information over the subcarriers.

Figure 2A:
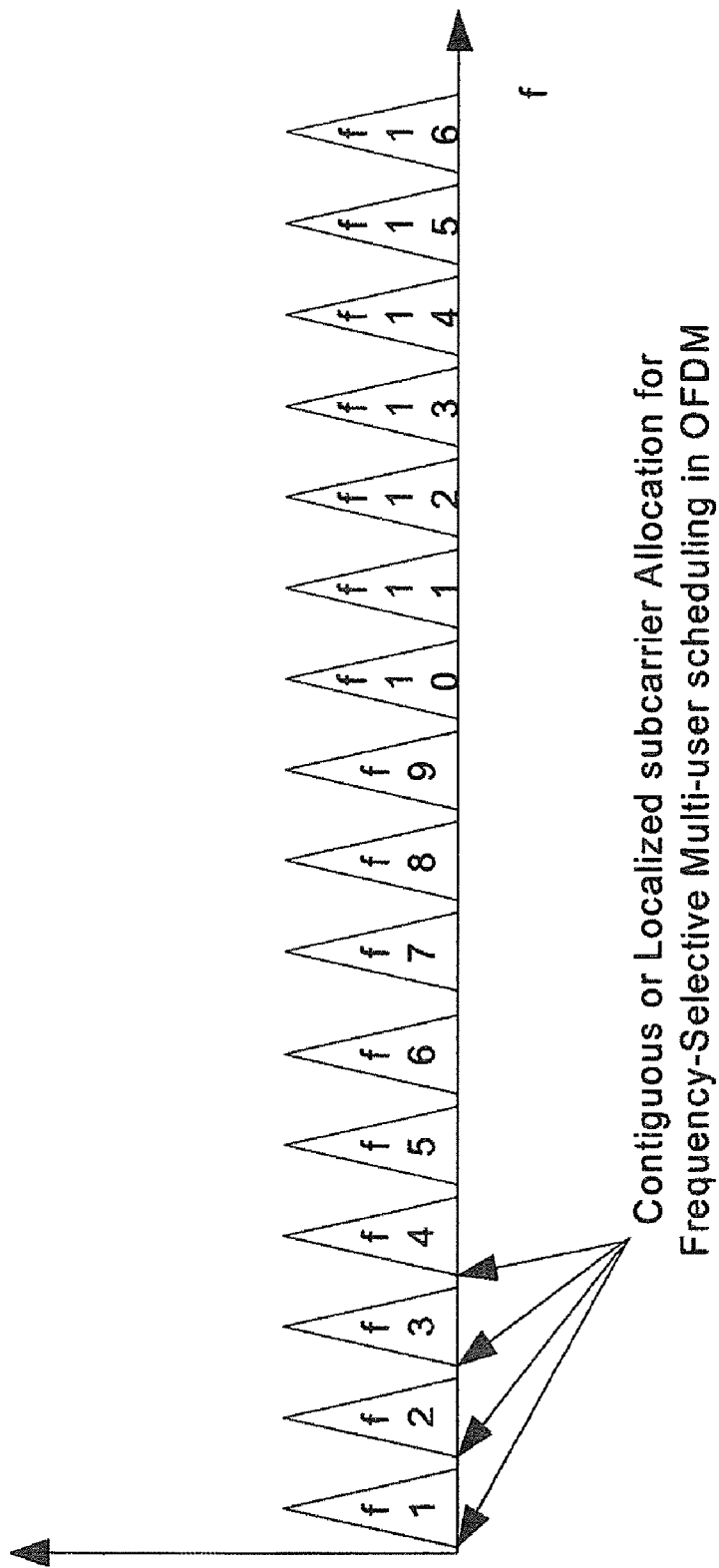
FIGS. 2A and 2B schematically illustrate two schemes of subcarrier allocation of frequency-selective multi-user scheduling and frequency diversity in an OFDM system.
Figure 2B:
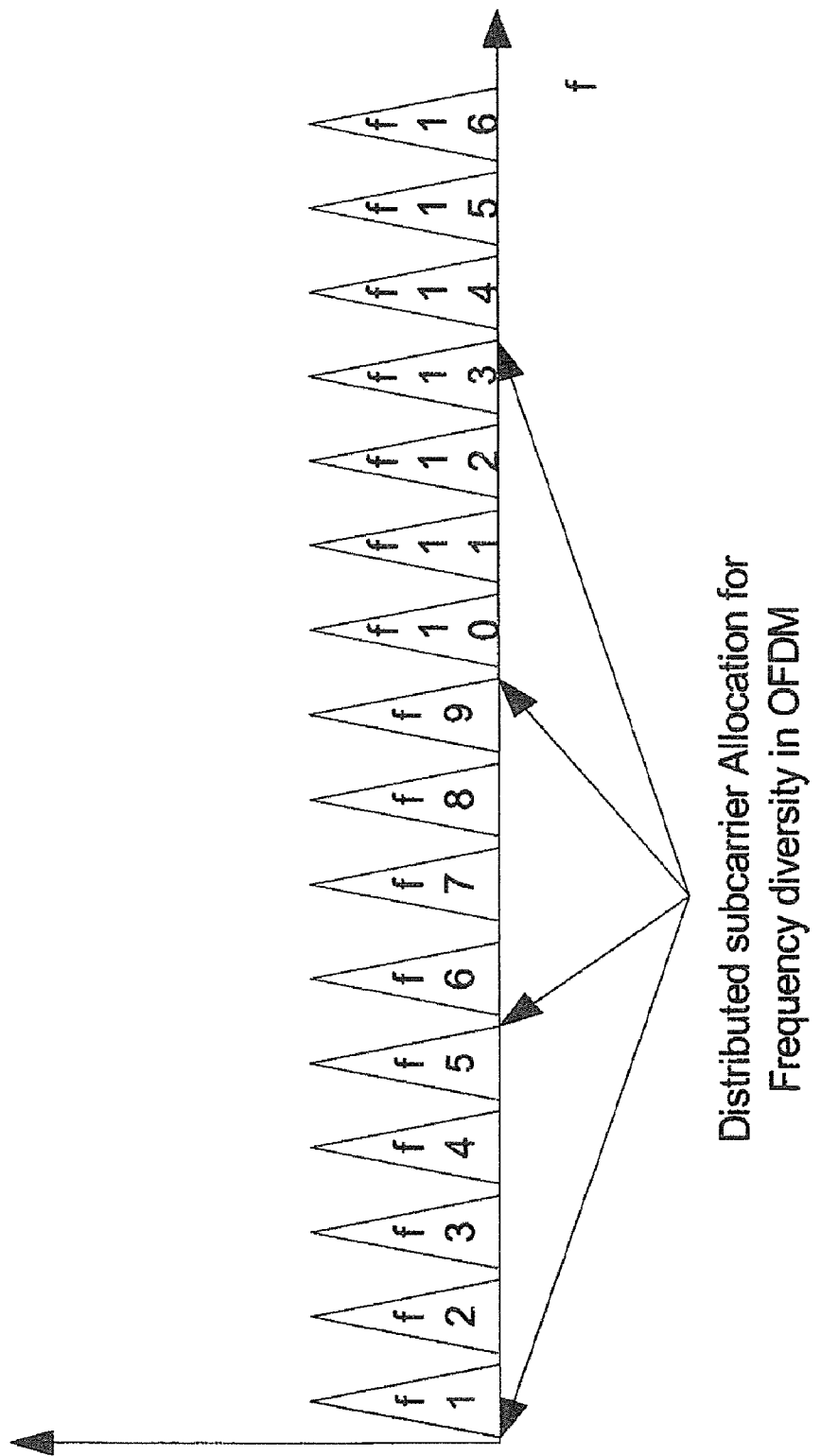

In case of frequency-selective multi-user scheduling, a contiguous set of subcarriers potentially experiencing an upfade is allocated for transmission to a user. The total bandwidth is divided into subbands grouping multiple contiguous subcarriers as shown in FIG. 2A where subcarriers $f_1$, $f_2$, $f_3$ and $f_4$ are grouped into a subband for transmission to a user in frequency-selective multi-user scheduling mode. In case of frequency-diversity transmission, however, the allocated subcarriers are preferably uniformly distributed over the whole spectrum. As shown in FIG. 2B, subcarriers $f_1$, $f_5$, $f_9$ and $f_{13}$ are grouped into a subband for transmission. The frequency-selective multi-user scheduling is generally beneficial for low mobility users for which the channel quality can be tracked. But the channel quality generally can not be tracked for high mobility users (particularly in a frequency-division-duplex system where the fading between the downlink and uplink is independent) due to channel quality feedback delays and hence the frequency diversity transmission mode is preferred.

Figure 3:
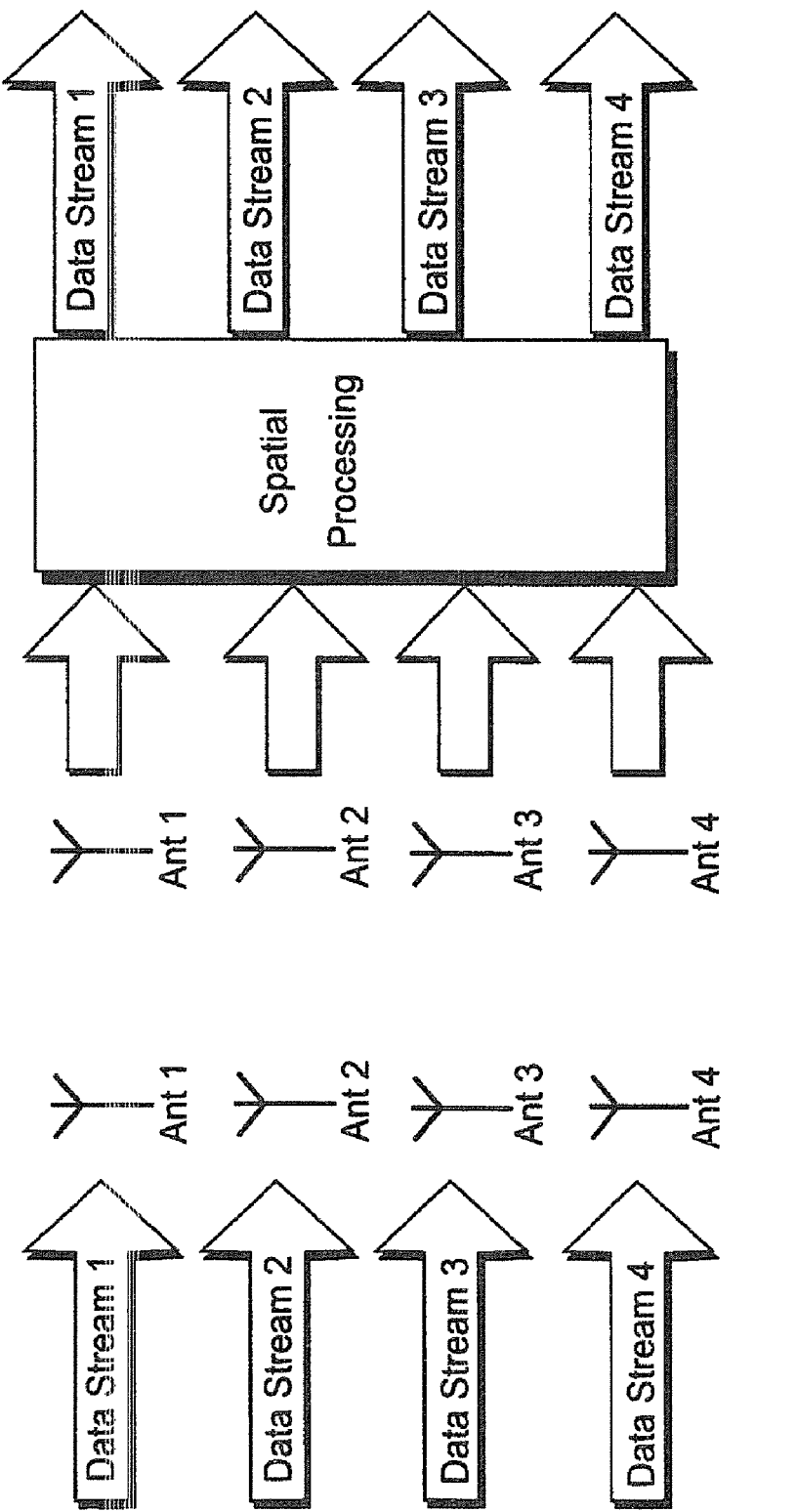
FIG. 3 schematically illustrates a transmission and reception scheme in a multiple input and multiple output (MIMO) system.

Multiple Input Multiple Output (MIMO) schemes use multiple transmit antennas and multiple receive antennas to improve the capacity and reliability of a wireless communication channel. A MIMO system promises linear increase in capacity with K where K is the minimum of number of transmit (M) and receive antennas (N), i.e. K=min (M,N). A simplified example of a 4×4 MIMO system is shown in FIG. 3. In this example, four different data streams are transmitted separately from the four transmit antennas. The transmitted signals are received at the four receive antennas. Some form of spatial signal processing is performed on the received signals in order to recover the four data streams. An example of spatial signal processing is vertical Bell Laboratories Layered Space-Time (V-BLAST) which uses the successive interference cancellation principle to recover the transmitted data streams. Other variants of MIMO schemes include schemes that perform some kind of space-time coding across the transmit antennas (e.g., diagonal Bell Laboratories Layered Space-Time (D-BLAST)) and also beamforming schemes such as Spatial Division multiple Access (SDMA).

The MIMO channel estimation consists of estimating the channel gain and phase information for links from each of the transmit antennas to each of the receive antennas. Therefore, the channel for M×N MIMO system consists of an N×M matrix:

$$H = \begin{bmatrix} a_{11} & a_{12} & \ldots & a_{1M} \\ a_{21} & a_{22} & \ldots & a_{2M} \\ \vdots & \vdots & \ddots & \vdots \\ a_{N1} & a_{N2} & \ldots & a_{NM} \end{bmatrix} \quad (1)$$

where $a_{ij}$ represents the channel gain from transmit antenna j to receive antenna i. In order to enable the estimations of the elements of the MIMO channel matrix, separate pilots are transmitted from each of the transmit antennas.

An optional precoding protocol that employs a unitary pre-coding before mapping the data streams to physical antennas is shown in FIGS. 5A and 5B. The optional precoding creates a set of virtual antennas (VA) 171 before the pre-coding. In this case, each of the codewords is potentially transmitted through all the physical transmission antennas 172. Two examples of unitary precoding matrices, $P_1$ and $P_2$ for the case of two transmission antennas 172 may be:

$$P_1 = \frac{1}{\sqrt{2}}\begin{bmatrix} 1 & 1 \\ 1 & -1 \end{bmatrix}, P_2 = \frac{1}{\sqrt{2}}\begin{bmatrix} 1 & 1 \\ j & -j \end{bmatrix} \quad (2)$$

Assuming modulation symbols $S_1$ and $S_2$ are transmitted at a given time through stream 1 and stream 2 respectively. Then the modulation symbol $T_1$ after precoding with matrix $P_1$ in the example as shown in FIG. 5A and the modulation symbol $T_2$ after precoding with matrix $P_2$ in the example as shown in FIG. 5B can be respectively written as:

$$T_1 = P_1\begin{bmatrix} S_1 \\ S_2 \end{bmatrix} = \frac{1}{\sqrt{2}}\begin{bmatrix} 1 & 1 \\ 1 & -1 \end{bmatrix} \times \begin{bmatrix} S_1 \\ S_2 \end{bmatrix} = \frac{1}{\sqrt{2}}\begin{bmatrix} S_1 + S_2 \\ S_1 - S_2 \end{bmatrix} \quad (3)$$

$$T_2 = P_2\begin{bmatrix} S_1 \\ S_2 \end{bmatrix} = \frac{1}{\sqrt{2}}\begin{bmatrix} 1 & 1 \\ j & -j \end{bmatrix} \times \begin{bmatrix} S_1 \\ S_2 \end{bmatrix} = \frac{1}{\sqrt{2}}\begin{bmatrix} S_1 + S_2 \\ jS_1 - jS_2 \end{bmatrix}$$

Therefore, the symbols $$T_{11} = \frac{(S_1 + S_2)}{\sqrt{2}} \text{ and } T_{12} = \frac{(S_1 - S_2)}{\sqrt{2}}$$

will be transmitted via antenna 1 and antenna 2, respectively, when precoding is done using precoding matrix $P_1$ as shown in FIG. 4A. Similarly, the symbols $$T_{21} = \frac{(S_1 + S_2)}{\sqrt{2}} \text{ and } T_{22} = \frac{(jS_1 - jS_2)}{\sqrt{2}}$$

will be transmitted via antenna 1 and antenna 2, respectively, when precoding is done using precoding matrix $P_2$ as shown in FIG. 4B. It should be noted that precoding is done on an OFDM subcarrier level before the IFFT operation as illustrated in FIGS. 4A and 4B.

In a pre-coded MIMO system, inverse operations are performed at the receiver to recover the transmitted symbols. The received symbols are multiplied with the inverse precoding matrices. The inverse precoding matrices are given as:

$$inv(P_1) = \frac{1}{\sqrt{2}}\begin{bmatrix} 1 & 1 \\ 1 & -1 \end{bmatrix}, inv(P_2) = \frac{1}{\sqrt{2}}\begin{bmatrix} 1 & -j \\ 1 & j \end{bmatrix} \quad (4)$$

It should be noted that the inverse of a unitary precoding matrix can simply be obtained by taking the complex conjugate transpose of the pre-coding matrix. The transmitted symbols are decoded by multiplying the received symbol vector with the inverse pre-coding matrices. Therefore, the transmitted symbols are given as:

$$\frac{1}{\sqrt{2}}\begin{bmatrix} 1 & 1 \\ 1 & -1 \end{bmatrix} \times \frac{1}{\sqrt{2}}\begin{bmatrix} S_1+S_2 \\ S_1-S_2 \end{bmatrix} = \begin{bmatrix} S_1 \\ S_2 \end{bmatrix}, \quad (5)$$

$$\frac{1}{\sqrt{2}}\begin{bmatrix} 1 & -j \\ 1 & j \end{bmatrix} \times \frac{1}{\sqrt{2}}\begin{bmatrix} S_1+S_2 \\ jS_1-jS_2 \end{bmatrix} = \begin{bmatrix} S_1 \\ S_2 \end{bmatrix}.$$

A downlink physical channel corresponds to a set of resource elements carrying information originating from higher layers. First, a plurality of information bits are coded with a plurality of code words to generate a plurality of blocks. For the downlink transmission in a physical channel, the block of bits $b^{(q)}(0), \ldots, b^{(q)}(M_{bit}^{(q)}-1)$ in each code word q, shall be scrambled prior to modulation, resulting in a block of scrambled bits $c^{(q)}(0), \ldots, c^{(q)}(M_{bit}^{(q)}-1)$. Here, $M_{bit}^{(q)}$ is the number of bits in code word q to be transmitted on the physical downlink channel. Up to two code words can be transmitted in one subframe, i.e., $q \in \{0, 1\}$. Then, the block of scrambled bits $c^{(q)}(0), \ldots, c^{(q)}(M_{bit}^{(q)}-1)$ for each code word q shall be modulated using either Quadrature phase-shift keying (QPSK), or order-16 Quadrature amplitude modulation (16QAM), or order-64 Quadrature amplitude modulation (64QAM), resulting in a block of complex-valued modulation symbols $d^{(q)}(0), \ldots, d^{(q)}(M_{symb}^{(q)}-1)$. The complex-valued modulation symbols for each of the code words to be transmitted are mapped onto one or several transmission layers. Complex-valued modulation symbols $d^{(q)}(0), \ldots, d^{(q)}(M_{symb}^{(q)}-1)$ for code word q shall be mapped onto the layers $x(i)=[x^{(0)}(i) \ldots x^{(v-1)}(i)]^T$ according to a certain codeword-to-layer mapping scheme described in Section 5.3.3 of 3GPP TS 36.211, where $\upsilon$ is the number of layers. Subsequently, a block of vectors $x(i)=[x^{(0)}(i) \ldots x^{(v-1)}(i)]^T$ from the layer mapping is precoded to generate a block of vectors $y(i)=[y^{(0)}(i) \ldots y^{(P-1)}(i)]^T$, where P is the number of antenna ports and is equal to or larger than the rank $\rho$ of the transmission. The block of complex-valued symbols $y^{(p)}(0), \ldots, y^{(p)}(M_s^{(p)}-1)$ shall be mapped to resource elements (k,l) on antenna port p not used for other purposes in increasing order of first the index k and then the index l.

We described a precoding approach that applies to both transmit diversity and MIMO spatial multiplexing. A composite precoder is constructed based on a unitary precoder such as Fourier matrix precoder multiplied with another unitary precoder representing a transmit diversity scheme such as cyclic delay diversity. It should be noted that the principles of the to current invention also applies to the cases of non-unitary precoding or unitary precoders other than Fourier matrix precoder.

A Fourier matrix is a N×N square matrix with entries given by:

$$P_N = e^{j2\pi mn/N} \quad m,n=0,1, \ldots (N-1). \quad (6)$$

For example, a 2×2 Fourier matrix can be expressed as:

$$P_2 = \begin{bmatrix} 1 & 1 \\ 1 & e^{j\pi} \end{bmatrix} = \begin{bmatrix} 1 & 1 \\ 1 & -1 \end{bmatrix}. \quad (7)$$

Similarly, a 4×4 Fourier matrix can be expressed as:

$$P_4 = \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} = \begin{bmatrix} 1 & 1 & 1 & 1 \\ 1 & j & -1 & -j \\ 1 & -1 & 1 & -1 \\ 1 & -j & -1 & j \end{bmatrix}. \quad (8)$$

Multiple Fourier matrices can be defined by introducing a shift parameter (g/G) in the Fourier matrix. The entry of the multiple Fourier matrices is given by:

$$P_{mn} = e^{j2\pi \frac{m}{N}\left(n+\frac{g}{G}\right)} \quad (9)$$

$$m, n = 0, 1, \ldots (N-1).$$

A set of four 2×2 Fourier matrices can be defined by taking G=4, and g=0, 1, 2 and 3, and are written as:

$$P_2^0 = \begin{bmatrix} 1 & 1 \\ 1 & -1 \end{bmatrix}, P_2^1 = \begin{bmatrix} 1 & 1 \\ e^{j\pi/4} & -e^{j\pi/4} \end{bmatrix}, \quad (10)$$

$$P_2^2 = \begin{bmatrix} 1 & 1 \\ e^{j\pi/2} & -e^{j\pi/2} \end{bmatrix}, P_2^3 = \begin{bmatrix} 1 & 1 \\ e^{j3\pi/4} & -e^{j3\pi/4} \end{bmatrix}.$$

Figure 6A:
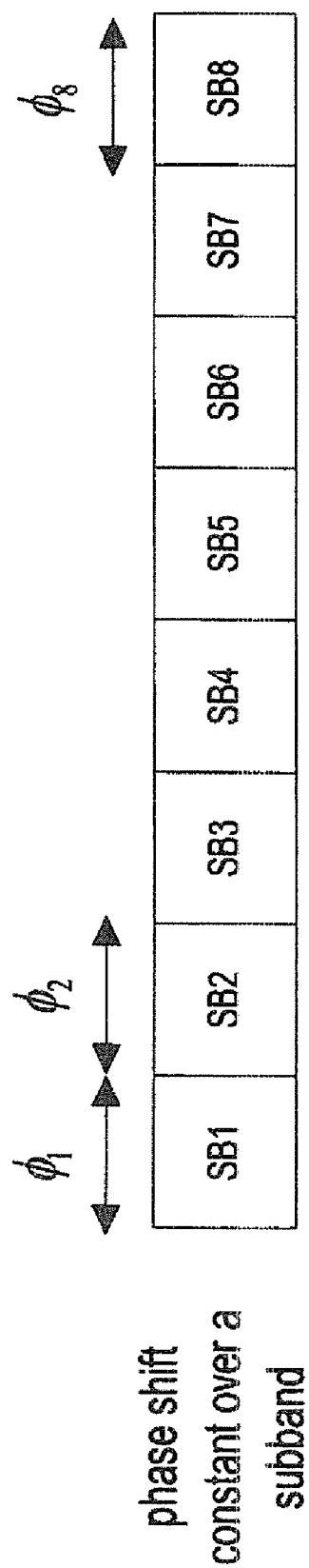
FIGS. 6A and 6B illustrate two schemes of applying phase shift to subcarriers.
Figure 6B:
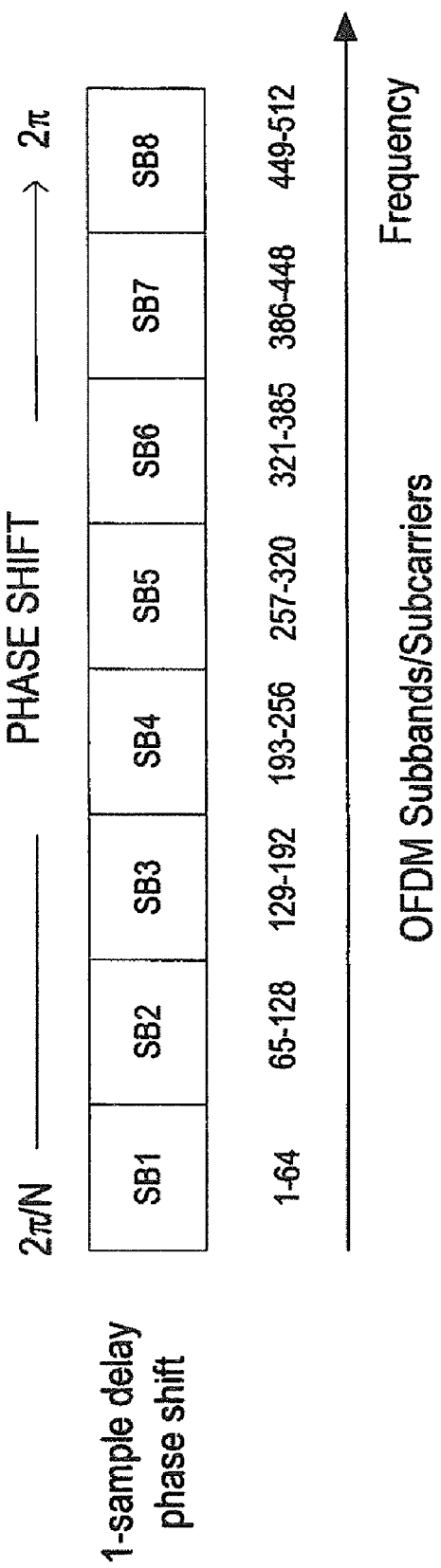

A cyclic delay diversity scheme can be implemented in the frequency domain with a phase shift of $e^{j\phi_i k}$ applied to subcarrier k transmitted from the i-th transmission antenna. The angle $\phi_i$ is given as:

$$\varphi_i = \frac{2\pi}{N}D_i, \quad (11)$$

where $D_i$ is the cyclic delay in samples applied from the i-th antenna. It should be noted that other functions can be used to derive the frequency domain phase shift. The phase shift may be kept constant for a group of subcarriers. As shown in FIG. 6A, phase shift $\phi_1$ is constant over subband (SB) 1, $\phi_2$ is constant SB2, and so on. It is also possible to allow the phase shift to vary from one group of subcarriers to the next. As shown in FIG. 6B, the phase shift varies from $2\pi/N$ to $2\pi$ over a frequency range from subcarrier 1 to subcarrier 512.

The cyclic delay diversity can be seen as precoding with the following precoding matrix for the case of four transmission antennas:

$$D_4 = \begin{bmatrix} 1 & 0 & 0 & 0 \\ 0 & e^{j\varphi_1 k} & 0 & 0 \\ 0 & 0 & e^{j\varphi_2 k} & 0 \\ 0 & 0 & 0 & e^{j\varphi_3 k} \end{bmatrix}. \quad (12)$$

Figure 7:
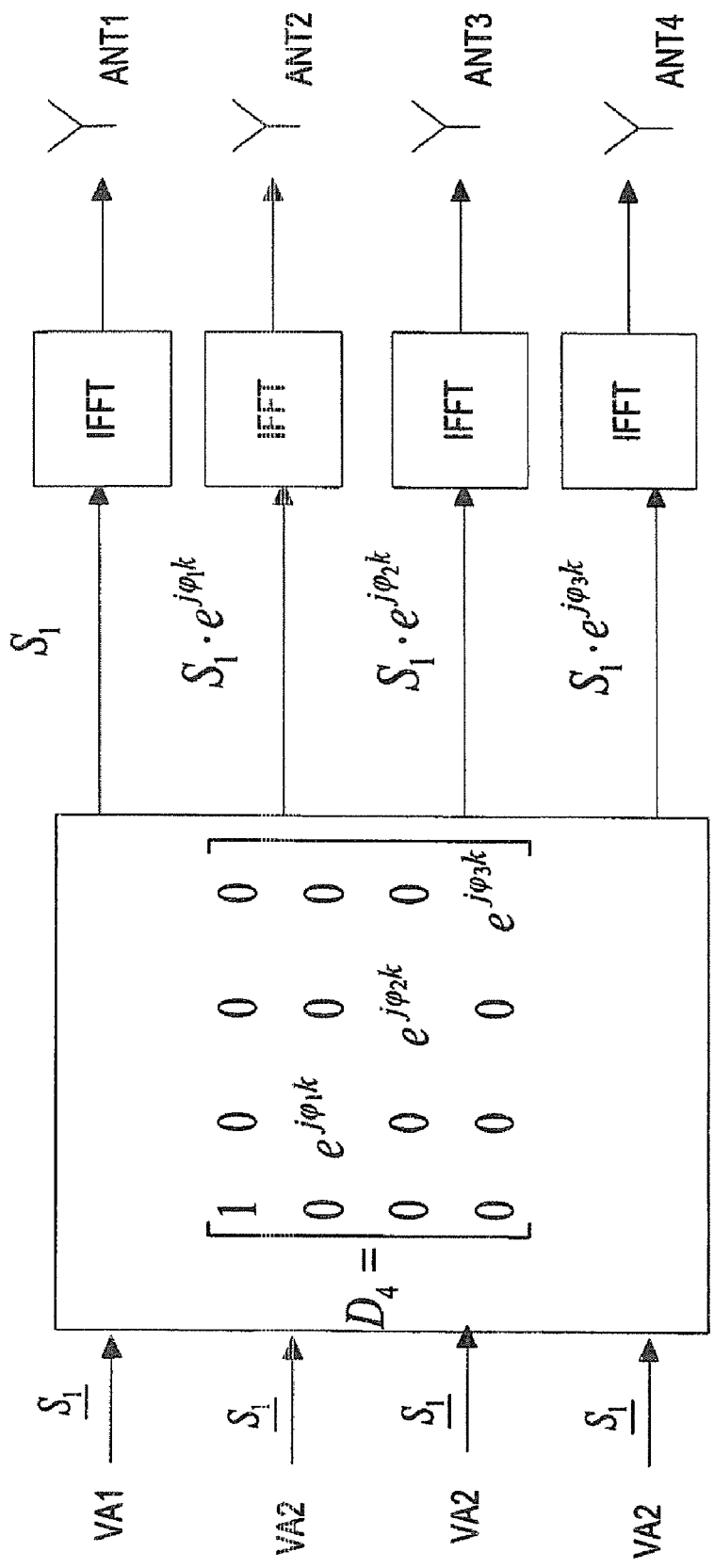
FIG. 7 schematically illustrates a cyclic delay diversity precoding scheme.

FIG. 7 schematically illustrates a transmitter provided with the CDD precoding scheme using the above precoding matrix. It can be noted that the same symbol with antenna and frequency (subcarrier) dependent phase shifts are transmitted from multiple antenna. No phase shift is applied for the symbol transmitted from the first antenna.

In 3GPP RAN1 contribution R1-073096, "Text Proposal for 36.211 regarding CDD Design", published in June 2007, Orlando, USA, a joint proposal is depicted that includes both small and large delay CDD.

For zero-delay and small-delay CDD, precoding for spatial multiplexing shall be performed according to the following equation:

$$y(i) = D(i) \cdot W(i) \cdot x(i), \quad (13)$$

where the precoding matrix W(i) is of size P×υ, P is the number of antenna ports, υ is the number of layers, the matrix D(i) is a diagonal matrix for support of small or zero cyclic delay diversity, and the matrix x(i) denotes the signal to be transmitted on the i-th subcarrier. Here, $x(i) = [x^{(0)}(i) \ldots x^{(\upsilon-1)}(i)]^T$, where $x^{(j)}(i)$ denotes the signal to be transmitted on the i-th subcarrier in the j-th layer. The matrix D(i) shall be selected from Table 1, where a user equipment (UE)-specific value of δ is semi-statically configured in the UE and the Node B (i.e., the base station) by higher layers. The quantity η in Table 1 is the smallest number from a set {128, 256, 512, 1024, 2048}, such that $\eta \geq N_{BW}^{DL}$, with $N_{BW}^{DL}$ being the number of subcarriers in a downlink bandwidth.

TABLE 1

Zero and small delay cyclic delay diversity (TS 36.211, version 1.1.0)

| Number of antenna ports P | D(i) | Transmission rank ρ | δ No CDD | δ Small delay |
|---|---|---|---|---|
| 1 | [1] | 1 | — | — |
| 2 | $\begin{bmatrix} 1 & 0 \\ 0 & e^{-j2\pi \cdot i \cdot \delta} \end{bmatrix}$ | 1<br>2 | 0 | 2/η |
| 4 | $\begin{bmatrix} 1 & 0 & 0 & 0 \\ 0 & e^{-j2\pi \cdot i \cdot \delta} & 0 & 0 \\ 0 & 0 & e^{-j2\pi \cdot i \cdot 2\delta} & 0 \\ 0 & 0 & 0 & e^{-j2\pi \cdot i \cdot 3\delta} \end{bmatrix}$ | 1<br>2<br>3<br>4 | 0 | 1/η<br>1/η<br>1/η<br>1/η |

Note that these values apply only when transmit diversity is not configured for transmission rank 1.

For spatial multiplexing, the values of W(i) shall be selected among the precoder elements in the codebook configured in the Node B and the UE. Node B can further confine the precoder selection in the UE to a subset of the elements in the codebook using codebook subset restriction. According to TS 36.211, version 1.1.0, the configured codebook shall be equal to Table 2. Note that the number of layers υ is equal to the transmission rank ρ in case of spatial multiplexing.

TABLE 2

Codebook for spatial multiplexing (TS 36.211, version 1.1.0)

| Number of antenna ports P | Transmission rank ρ | Codebook | | | | | |
|---|---|---|---|---|---|---|---|
| 1 | 1 | [1] | — | — | — | — | — |
| 2 | 1 | $\begin{bmatrix} 1 \\ 0 \end{bmatrix}$ | $\begin{bmatrix} 0 \\ 1 \end{bmatrix}$ | $\frac{1}{\sqrt{2}}\begin{bmatrix} 1 \\ 1 \end{bmatrix}$ | $\frac{1}{\sqrt{2}}\begin{bmatrix} 1 \\ -1 \end{bmatrix}$ | $\frac{1}{\sqrt{2}}\begin{bmatrix} 1 \\ j \end{bmatrix}$ | $\frac{1}{\sqrt{2}}\begin{bmatrix} 1 \\ -j \end{bmatrix}$ |
| | 2 | $\frac{1}{\sqrt{2}}\begin{bmatrix} 1 & 0 \\ 0 & 1 \end{bmatrix}$ | $\frac{1}{2}\begin{bmatrix} 1 & 1 \\ 1 & -1 \end{bmatrix}$ | $\frac{1}{2}\begin{bmatrix} 1 & 1 \\ j & -j \end{bmatrix}$ | — | — | — |
| 4 | 1 | | | | | | |
| | 2 | | | | | | |
| | 3 | | | | | | |
| | 4 | | | | | | |

According to TS 36.211, version 8.2.0, For transmission on two antenna ports, $p \in \{0,1\}$, the precoding matrix W(i) for zero, small, and large-delay CDD shall be selected from Table 3 or a subset thereof.

TABLE 3

Codebook for transmission on antenna ports {0, 1}.
(TS 36.211, version 8.2.0)

| Codebook index | Number of layers $\upsilon$ | |
| --- | --- | --- |
| | 1 | 2 |
| 0 | $\begin{bmatrix} 1 \\ 0 \end{bmatrix}$ | $\frac{1}{\sqrt{2}}\begin{bmatrix} 1 & 0 \\ 0 & 1 \end{bmatrix}$ |
| 1 | $\begin{bmatrix} 0 \\ 1 \end{bmatrix}$ | $\frac{1}{2}\begin{bmatrix} 1 & 1 \\ 1 & -1 \end{bmatrix}$ |
| 2 | $\frac{1}{\sqrt{2}}\begin{bmatrix} 1 \\ 1 \end{bmatrix}$ | $\frac{1}{2}\begin{bmatrix} 1 & 1 \\ j & -j \end{bmatrix}$ |
| 3 | $\frac{1}{\sqrt{2}}\begin{bmatrix} 1 \\ -1 \end{bmatrix}$ | — |
| 4 | $\frac{1}{\sqrt{2}}\begin{bmatrix} 1 \\ j \end{bmatrix}$ | — |
| 5 | $\frac{1}{\sqrt{2}}\begin{bmatrix} 1 \\ -j \end{bmatrix}$ | — |

For transmission on four antenna ports, $p \in \{0,1,2,3\}$, the preceding matrix W for zero, small, and large-delay CDD shall be selected from Table 4 or a subset thereof. The quantity $W_n^{\{s\}}$ denotes the matrix defined by the columns given by the set $\{s\}$ from the expression $W_n = I - 2u_n u_n^H / u_n^H u_n$ where I is the 4×4 identity matrix and the vector $u_n$ is given by Table 4.

TABLE 4

Codebook for transmission on antenna ports {0, 1, 2, 3} (TS 36.211, version 8.2.0)

| Codebook index | $u_n$ | Number of layers $\upsilon$ | | | |
| --- | --- | --- | --- | --- | --- |
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

For large-delay CDD, the precoding for spatial multiplexing shall be performed according to the following equation:

$$y(i)=W(i)\cdot D(i)\cdot U\cdot x(i), \quad (14)$$

where the precoding matrix W(i) is of size P×υ, P is the number of antenna ports, υ is the number of layers, the quantity D(i) is a diagonal matrix for support of large cyclic delay diversity, and U is a fixed matrix. The matrices U and D(i) are of size υ×υ. The elements of the fixed matrix U are defined as $U_{mn}=e^{-j2\pi mn/\upsilon}$, for m=0, 1, ..., υ−1, and n=0, 1, ..., υ−1. According to TS 36.211, version 1.1.0, the matrix D(i) shall be selected from Table 5.

TABLE 5

Large-delay cyclic delay diversity (TS 36.211, version 1.1.0)

| Number of antenna ports P | Transmission rank ρ | D(i) | δ Large delay |
|---|---|---|---|
| 1 | 1 | — | — |
| 2 | 1 | [1] | 0 |
| 2 | 2 | $\begin{bmatrix} 1 & 0 \\ 0 & e^{-j2\pi \cdot i \cdot \delta} \end{bmatrix}$ | 1/2 |
| 4 | 1 | [1] | 0 |
| 4 | 2 | $\begin{bmatrix} 1 & 0 \\ 0 & e^{-j2\pi \cdot i \cdot \delta} \end{bmatrix}$ | 1/2 |
| 4 | 3 | $\begin{bmatrix} 1 & 0 & 0 \\ 0 & e^{-j2\pi \cdot i \cdot \delta} & 0 \\ 0 & 0 & e^{-j2\pi \cdot i \cdot 2\delta} \end{bmatrix}$ | 1/3 |
| 4 | 4 | $\begin{bmatrix} 1 & 0 & 0 & 0 \\ 0 & e^{-j2\pi \cdot i \cdot \delta} & 0 & 0 \\ 0 & 0 & e^{-j2\pi \cdot i \cdot 2\delta} & 0 \\ 0 & 0 & 0 & e^{-j2\pi \cdot i \cdot 3\delta} \end{bmatrix}$ | 1/4 |

Note that the value of δ in Table 1 and the value of δ in Table 5 are not the same.

According to TS 36.211, version 8.2.0, the matrices U and D(i) shall be selected from Table 6.

TABLE 6

Large-delay cyclic delay diversity (TS 36.211, version 8.2.0)

| Number of layers υ | U | D(i) |
|---|---|---|
| 1 | [1] | [1] |
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

For spatial multiplexing, the values of W(i) shall be selected among the precoder elements in the codebook configured in the Node B and the UE. Node B can further confine the precoder selection in the UE to a subset of the elements in the codebook using codebook subset restriction. The configured codebook shall be equal to Table 3 and Table 4. Note that the number of layers υ is equal to the transmission rank ρ in case of spatial multiplexing.

Furthermore, a codeword cycling method is proposed for the large delay equation, y(i)=D(i)·W(i)·U·x(i), so that W(i) is cyclically selected as one of the codeword in either the codebook in Table 3 for two antenna ports, and in Table 4 for four antenna ports, or a subset of the codebooks. It is proposed that the codeword changes either every subcarrier, or every v subcarriers, where v is the transmission rank.

In a first embodiment according to the principles of the present invention, we propose to perform codeword cycling in the large delay CDD method y(i)=W(i)·D(i)·U·x(i) for every resource block (RB) or every integer number of RBs. For LTE system one RB consists of twelve subcarriers. Therefore, the codeword W(i) is selected according to W(i)=$C_k$, where k is given by $$k = \begin{cases} 1, & \text{if } \mod\left(\left\lceil \frac{i}{12m} \right\rceil, N\right) = 1 \\ 2, & \text{if } \mod\left(\left\lceil \frac{i}{12m} \right\rceil, N\right) = 2 \\ \vdots \\ N, & \text{if } \mod\left(\left\lceil \frac{i}{12m} \right\rceil, N\right) = 0, \end{cases} \quad (15)$$

or, more concisely, $$k = \mod\left(\left\lceil \frac{i}{12m} \right\rceil - 1, N\right) + 1.$$

Here m>0 is a non-negative integer and 12 is the number of subcarriers in a RB. Furthermore, $C_k$ denotes the k-th codeword in the single-user MIMO (SU-MIMO) precoding codebooks defined in Table 3 for two antenna ports, and in Table 4 for four antenna ports, or a subset thereof, and N is the codebook size or the size of the subset. Also note that mod(x) is a modulo operation and ⌈x⌉ is a ceiling operation.

In a second embodiment according to the principles of the present invention, we propose to perform codeword cycling in the small delay CDD method y(i)=D(i)·W(i)·x(i) for every q subcarriers. Therefore, the codeword W(i) is selected according to W(i)=$C_k$, where k is given by $$k = \begin{cases} 1, & \text{if } \mod\left(\left\lceil\frac{i}{q}\right\rceil, N\right) = 1 \\ 2, & \text{if } \mod\left(\left\lceil\frac{i}{q}\right\rceil, N\right) = 2 \\ \vdots \\ N, & \text{if } \mod\left(\left\lceil\frac{i}{q}\right\rceil, N\right) = 0, \end{cases} \quad (16)$$

or, more concisely, $$k = \mod\left(\left\lceil\frac{i}{q}\right\rceil - 1, N\right) + 1.$$

Here q>0 is an arbitrary non-negative integer. Examples of q value include q=1, or q=υ where υ is the transmission rank, or q=12 m (cycle every m RBs) where m>0 is a non-negative number and 12 is the number of subcarriers in a RB. Furthermore, $C_k$ denotes the k-th codeword in the single-user MIMO (SU-MIMO) precoding codebooks defined in Table 3 for two antenna ports, and in Table 4 for four antenna ports, or a subset thereof, and N is the codebook size or the size of the subset. Also note that mod(x) is a modulo operation and ⌈x⌉ is a ceiling operation.

In a third embodiment according to the principles of the present invention, we propose to perform codeword cycling in a uniform small and large delay CDD method as given by:

$$y(i)=D(i)\cdot W(i)\cdot C(i)\cdot x(i) \quad (17)$$

for every q subcarriers. In the above equation, D(i) stands for a diagonal matrix for support of small delay CDD operation and D(i) shall be selected from Table 1 for the i-th subcarrier, C(i) stands for of the large delay CDD operation for the i-th subcarrier, and C(i)=D'(i)·U, where D'(i) is a diagonal matrix for support of large delay CDD operation, and U is a fixed matrix. The matrices D'(i) and U are of size υ×υ, and shall be selected from Table 6. Therefore, the codeword W(i) is selected according to W(i)=$C_k$, where k is given by:

$$k = \begin{cases} 1, & \text{if } \mod\left(\left\lceil\frac{i}{q}\right\rceil, N\right) = 1 \\ 2, & \text{if } \mod\left(\left\lceil\frac{i}{q}\right\rceil, N\right) = 2 \\ \vdots \\ N, & \text{if } \mod\left(\left\lceil\frac{i}{q}\right\rceil, N\right) = 0, \end{cases} \quad (18)$$

or, more concisely, $$k = \mod\left(\left\lceil\frac{i}{q}\right\rceil - 1, N\right) + 1.$$

Here q>0 is an arbitrary non-negative integer. Examples of q value include q=1, or q=υ where υ is the transmission rank, or q=12 m (cycle every m RBs) where m>0 is a non-negative number and 12 is the number of subcarriers in a RB. Furthermore, $C_k$ denotes the k-th codeword in the single-user MIMO (SU-MIMO) precoding codebooks defined in Table 3 for two antenna ports, and in Table 4 for four antenna ports, or a subset thereof, and N is the codebook size or the size of the subset. Also note that mod(x) is a modulo operation and ⌈x⌉ is a ceiling operation.

Figure 8:
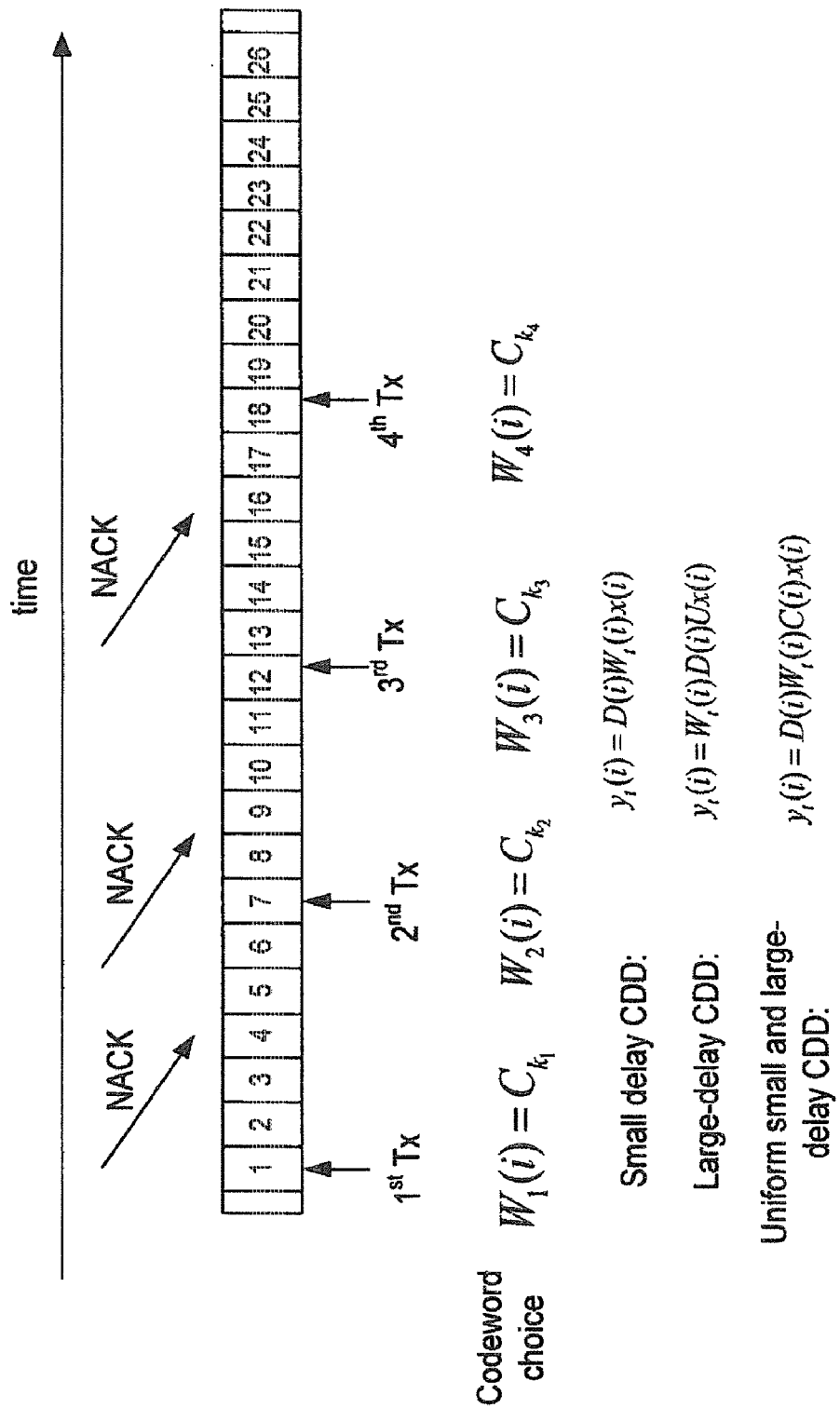
FIG. 8 schematically illustrates using different codewords in different retransmissions in a Hybrid automatic repeat and request (HARQ) scheme as one embodiment according to the principles of the present invention.

In a fourth embodiment according to the principles of the present invention, we propose to apply different codewords for different retransmission in a Hybrid automatic repeat-request (HARQ) system that uses either the small-delay CDD method y(i)=D(i)·W(i)·x(i), or the large delay method y(i)=W(i)·D(i)·U·x(i), or the uniform small-large delay method y(i)=D(i)·W(i)·C(i)·x(i). Let there be T re-transmissions in the HARQ system, and let $W_1(i)$, $W_2(i)$, . . . , $W_T(i)$ be the codewords used for these T retransmissions. The transmit signal for each retransmission is then given by $$y_t(i)=D(i)\cdot W_t(i)\cdot x(i) \quad (19)$$

for small delay CDD, and $$y_t(i)=W_t(i)\cdot D(i)\cdot U\cdot x(i) \quad (20)$$

for large delay CDD, and $$y_t(i)=D(i)\cdot W_t(i)\cdot C(i)\cdot x(i) \quad (21)$$

for uniform small and large delay CDD. Furthermore, we propose to select these codewords in such a way that $W_t(i)=C_{k_t}$ for t=1, . . . T, where $C_{k_t}$ denotes the $k_t$-th codeword in the codebook of the precoding codebook defined in Table 3 for two antenna ports, and in Table 4 for four antenna ports, or a subset thereof, and such that the choice of $C_{k_t}$ is independent for each retransmission, i.e, for the t-th transmission, $C_{k_t}$ can be any of the N codewords, regardless of which codeword is used in the previous transmissions. FIG. 8 illustrates how the different codewords are used in different re-transmissions.

Figure 9:
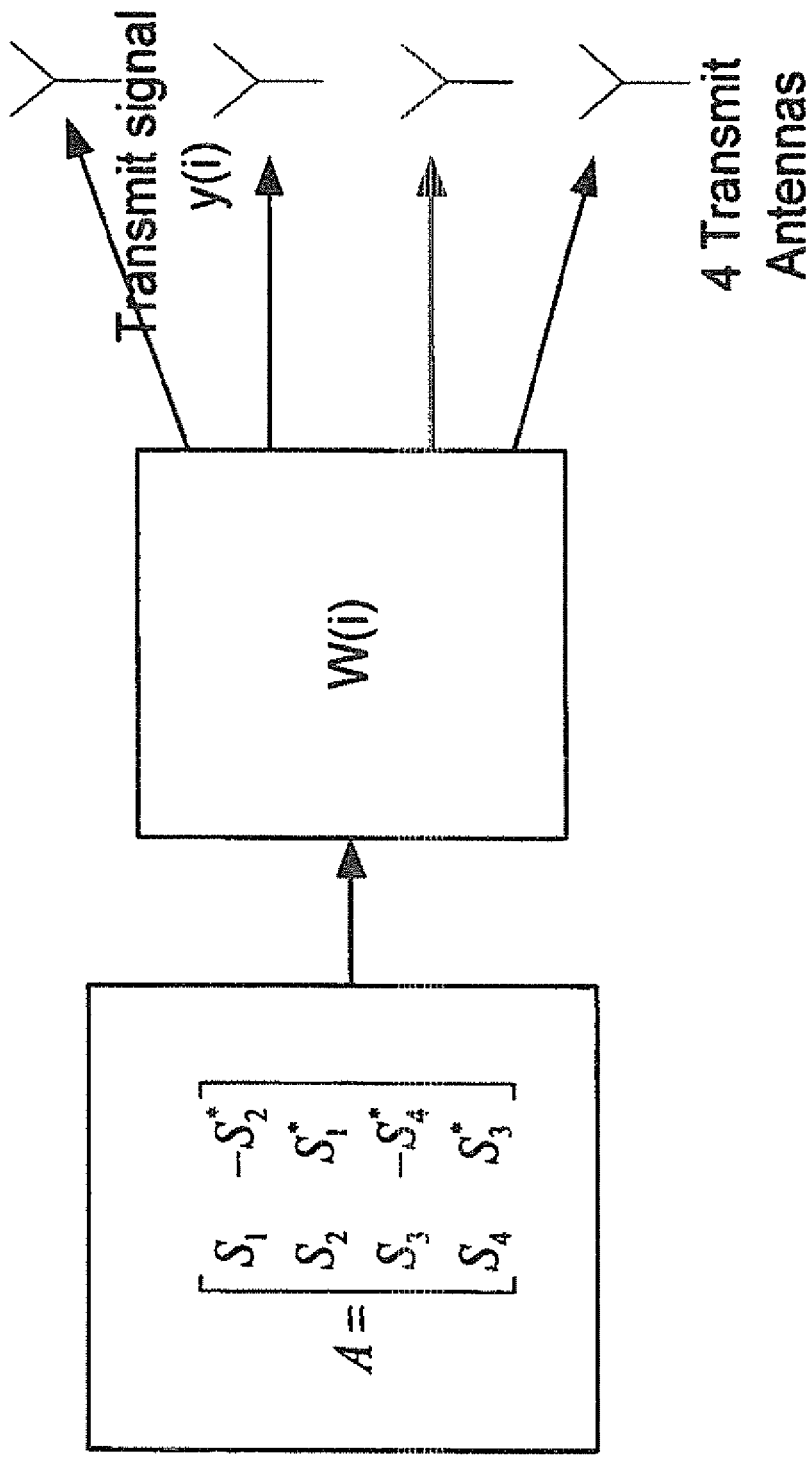
FIG. 9 schematically illustrates a scheme for precoding a rank-2 space frequency block code as another embodiment according to the principles of the present invention.

In a fifth embodiment according to the principles of the present invention, we propose to add a pre-coding process, denoted by matrix W(i) where i is the subcarrier index, at the output of the rank-2 space frequency block code (SFBC) block given by:

$$A = \begin{bmatrix} S_1 & -S_2^* \\ S_2 & S_1^* \\ S_3 & -S_4^* \\ S_4 & S_3^* \end{bmatrix}, \quad (22)$$

and this precoded rank-2 method is illustrated in FIG. 9. And the overall transmit signal is given by:

$$y(i)=W(i)\cdot A(i), \quad (23)$$

where we used the notation A(i) to emphasize the fact that the rank-2 SFBC transmission matrix is a function of the subcarrier index. That is, $$A(i) = \begin{bmatrix} S_1(i) & -S_2^*(i) \\ S_2(i) & S_1^*(i) \\ S_3(i) & -S_4^*(i) \\ S_4(i) & S_3^*(i) \end{bmatrix}. \quad (24)$$

In addition, note that $S_1$ to $S_4$ are generated from the same codeword.

One way to choose the codeword is to choose the W(i) according to the precoding matrix index (PMI) in the feedback, and W(i) belongs the codebook defined in Table 3 for two antenna ports, and in Table 4 for four antenna ports, or a subset thereof.

Another way to choose the codeword is to choose W(i) as an arbitrary unitary matrix that varies every q subcarriers, where q>0 is an arbitrary non-negative integer. Therefore, the codeword W(i) is selected according to W(i)=$C_k$, where k is given by:

$$k = \begin{cases} 1, & \text{if } \mod\left(\left\lceil\frac{i}{q}\right\rceil, N\right) = 1 \\ 2, & \text{if } \mod\left(\left\lceil\frac{i}{q}\right\rceil, N\right) = 2 \\ \vdots \\ N, & \text{if } \mod\left(\left\lceil\frac{i}{q}\right\rceil, N\right) = 0, \end{cases} \quad (25)$$

or, more concisely, $$k = \mod\left(\left\lceil\frac{i}{q}\right\rceil - 1, N\right) + 1.$$

Examples of q value include q=1, or q=υ where υ is the transmission rank, or q=12 m (cycle every m RBs) where m>0 is a non-negative number and 12 is the number of subcarriers in a RB. Furthermore, $C_k$ denotes the k-th codeword in the single-user MIMO (SU-MIMO) precoding codebook defined in Table 3 for two antenna ports, and in Table 4 for four antenna ports, or a subset thereof, and N is the codebook size or the size of the subset. Also note that mod(x) is a modulo operation and $\lceil x \rceil$ is a ceiling operation.

In a sixth embodiment according to the principles of the present invention, we propose to apply different codewords for different retransmission in a Hybrid automatic repeat-request (HARQ) system that uses the rank-2 SFBC transmission. Let there be T re-transmissions in the HARQ system, and let $W_1(i), W_2(i), \ldots, W_T(i)$ be the codeword used for these T retransmissions, the transmit signal for each retransmission is then given by:

$$y_t(i) = W_t(i) \cdot A(i). \quad (26)$$

Figure 10:
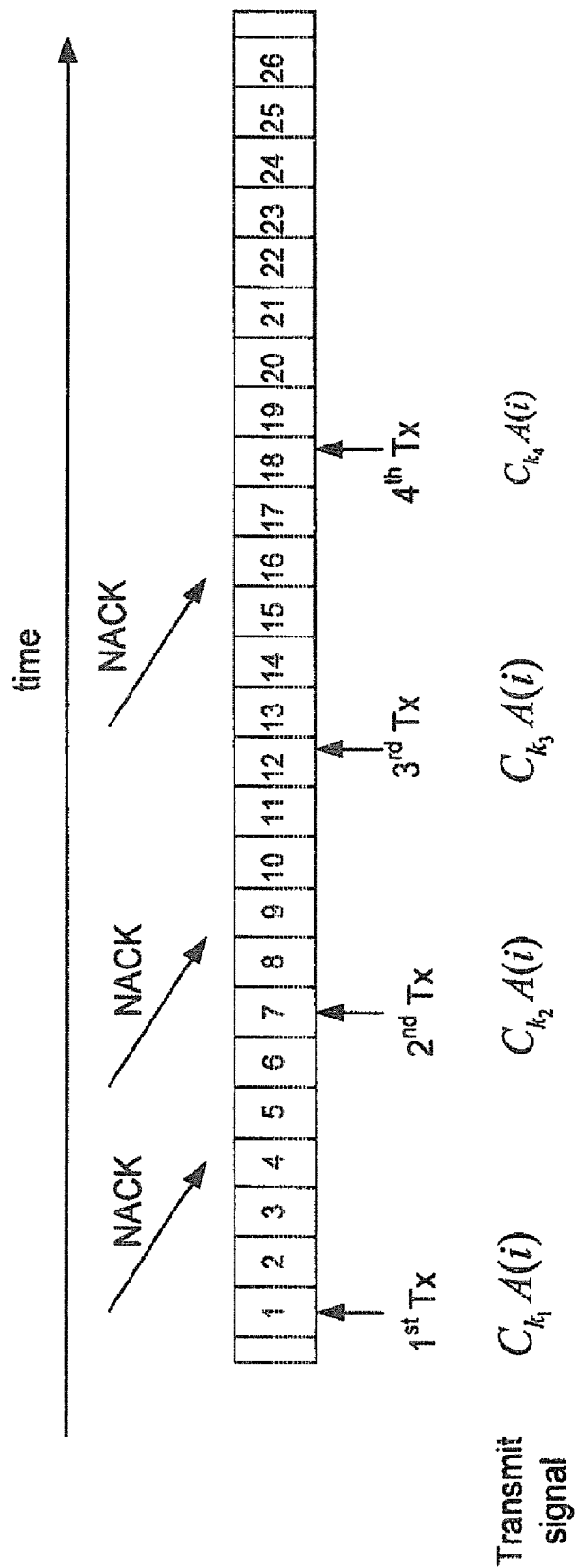
FIG. 10 schematically illustrates a scheme for precoding a rank-2 space frequency block code by applying different codewords in different retransmissions in a HARQ scheme as another embodiment according to the principles of the present invention.

Furthermore, we propose to select these codewords in such a way that $W_t(i) = C_{k_t}$ for t=1, ..., T, where $C_{k_t}$ denotes the $k_t$-th codeword in the codebook of the precoding codebook defined in Table 3 for two antenna ports, and in Table 4 for four antenna ports, or a subset thereof, and such that the choice of $C_{k_t}$ is independent for each retransmission, i.e, for the t-th transmission, $C_{k_t}$ can be any of the N codewords, regardless of which codeword is used in the previous transmissions. FIG. 10 illustrates how the different codewords are used in different re-transmissions.

In a seventh embodiment according to the principles of the present invention, we propose a scheme where mapping of symbols to antennas is changed on repeated symbols as shown in FIG. 11. In this example we assumed that four symbols $S_1, S_2, S_3$ and $S_4$ are transmitted with one repetition over eight subcarriers, or two groups of subcarriers in two subframes, with four subcarriers in each group. In the first four subcarriers, symbols $S_1$ and $S_2$ are transmitted on antennas ports ANT0 and ANT1, while symbols $S_3$ and $S_4$ are transmitted on antennas ports ANT2 and ANT3. On repetition in the last four subcarriers, the symbols $S_1$ and $S_2$ are transmitted on antennas ports ANT2 and ANT3 while symbols $S_3$ and $S_4$ are transmitted on antennas ports ANT0 and ANT1. This proposed mapping results in greater diversity gain compared to the transmission where mapping does not change on repetition. This diversity gains stems from the fact that after one repetition all the four symbols are transmitted from all the four transmit antennas.

In the proposed mapping scheme, the transmission matrix $T_1$ shown below is used for initial transmission:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix}, \quad (27)$$

where $T_{ij}$ represents symbol transmitted on the ith antenna and the jth subcarrier or jth time slot (i=1,2,3,4, j=1,2,3,4) for the case of 4-Tx antennas. When the same symbols are repeated, a different mapping matrix $T_2$ shown below is used for transmission:

$$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} 0 & 0 & S_3 & S_4 \\ 0 & 0 & -S_4^* & S_3^* \\ S_1 & S_2 & 0 & 0 \\ -S_2^* & S_1^* & 0 & 0 \end{bmatrix}. \quad (28)$$

Note that the principles of the present invention may be applied to decoding information received from a transmitter. In this case, since the selection of precoding matrices is a function of time (subframe number) and frequency (subcarrier number), the receiver can simply observe the subframe number and subcarrier number, and use the same function to figure out the precoder matrix. The dependence of the precoding matrix selection on frequency is explicit from Equations (13) and (14). The dependence of the precoding matrix selection on time is explicit in the HARQ transmission scheme.

While the present invention has been shown and described in connection with the preferred embodiments, it will be apparent to those skilled in the art that modifications and variations can be made without departing from the spirit and scope of the invention as defined by the appended claims.

What is claimed is:

1. A transmission method, comprising:
   encoding a plurality of information bits to generate a plurality of coded bits;
   scrambling the plurality of coded bits to generate a plurality of scrambled bits;
   modulating the plurality of scrambled bits to generate a plurality of modulation symbols;
   mapping the plurality of modulation symbol onto a plurality of subcarriers in at least one transmission layer of a transmission resource;
   precoding the modulation symbols using a matrix for cyclic delay diversity and a set of codewords from a codebook to generate a plurality of precoded symbols, with a codeword used for precoding modulation symbols corresponding to an i-th subcarrier established by:

$$W(i) = C_k,$$

where $C_k$ is a k-th codeword in the set of codewords, with an index k established by:

$$k = \mod\left(\left\lceil\frac{i}{q}\right\rceil - 1, N\right) + 1,$$

where q is a certain positive integer, and N is the size of the set of codewords; and transmitting the precoded symbols via a plurality of transmission antennas.

2. The method of claim 1, wherein q=1.

3. The method of claim 1, wherein q=ρ, where ρ is a transmission rank.

4. The method of claim 1, wherein q=12 m, with m being a positive integer.

5. The method of claim 1, further comprising precoding the modulation symbols using a Fourier matrix with entries established by:

$$P_N = e^{j2\pi mn/N}, \text{ for } m,n=0,1,\ldots(N-1).$$

6. The method of claim 1, wherein the set of codewords comprises all of the codewords in the codebook.

7. The method of claim 1, wherein the set of codewords comprises a subset of the codewords in the codebook.

8. The method of claim 1, wherein indices of the codewords are determined by performing a modulo operation based on the number of transmission layers and a size of the set of the codewords in the codebook.

9. The method of claim 1, wherein the codebook comprises a single-user multiple input multiple output (SU-MIMO) codebook.

10. A wireless transmission system, comprising:
a transmitter chain configured to:
encode a plurality of information bits to generate a plurality of coded bits,
scramble the plurality of coded bits to generate a plurality of scrambled bits,
modulate the plurality of scrambled bits to generate a plurality of modulation symbols,
map the plurality of modulation symbol onto a plurality of subcarriers in at least one transmission layer of a transmission resource,
precode the modulation symbols by using a matrix for cyclic delay diversity and a set of codewords from a codebook to generate a plurality of precoded symbols, with a codeword used for precoding modulation symbols corresponding to an i-th subcarrier established by:

$$W(i)=C_k,$$

where $C_k$ is a k-th codeword in the set of codewords, with an index k established by:

$$k = \mathrm{mod}\left(\left\lceil \frac{i}{q} \right\rceil - 1, N\right) + 1,$$

where q is a certain positive integer, and N is the size of the set of codewords, and
transmit the precoded symbols via a plurality of transmission antennas.

11. The system of claim 10, wherein q=1.

12. The system of claim 10, wherein q=ρ, wherein ρ is a transmission rank.

13. The system of claim 10, wherein q=12 m, wherein m is a positive integer.

14. The system of claim 10, wherein the transmitter chain is further configured to precode the modulation symbols using a Fourier matrix with entries established by:

$$P_N = e^{j2\pi mn/N}, \text{ for } m,n=0,1,\ldots(N-1).$$

15. The system of claim 10, wherein the set of codewords comprises all of the codewords in the codebook.

16. The system of claim 10, wherein the set of codewords comprises a subset of the codewords in the codebook.

17. The system of claim 10, wherein the transmitter chain is further configured to determine indices of the codewords by performing a modulo operation based on the number of transmission layers and a size of the set of the codewords in the codebook.

18. The system of claim 10, wherein the codebook comprises a single-user multiple input multiple output (SU-MIMO) codebook.

19. A wireless reception apparatus, comprising:
a receiver chain configured to receive a plurality of precoded symbols via at least one antenna, wherein the precoded symbols are remotely generated by:
encoding a plurality of information bits to generate a plurality of coded bits,
scrambling the plurality of coded bits to generate a plurality of scrambled bits,
modulating the plurality of scrambled bits to generate a plurality of modulation symbols,
mapping the plurality of modulation symbol onto a plurality of subcarriers in at least one transmission layer of a transmission resource, and
precoding the modulation symbols by using a matrix for cyclic delay diversity and a set of codewords from a certain codebook to generate a plurality of precoded symbols, with a codeword used for precoding modulation symbols corresponding to an i-th subcarrier established by:

$$W(i)=C_k,$$

where $C_k$ is a k-th codeword in the set of codewords, with an index k established by:

$$k = \mathrm{mod}\left(\left\lceil \frac{i}{q} \right\rceil - 1, N\right) + 1,$$

where q is a certain positive integer, and N is the size of the set of codewords.

20. The apparatus of claim 19, wherein the codebook comprises a single-user multiple input multiple output (SU-MIMO) codebook.

* * * * *

UNITED STATES PATENT AND TRADEMARK OFFICE
CERTIFICATE OF CORRECTION

PATENT NO. : 8,401,107 B2
APPLICATION NO. : 13/448090
DATED : March 19, 2013
INVENTOR(S) : Jianzhong Zhang et al.

Page 1 of 1

It is certified that error appears in the above-identified patent and that said Letters Patent is hereby corrected as shown below:

On the Title Page

Item (60), delete "Provisional application No. 60/929,376, filed on Jun. 27, 2007." and insert --Provisional application No. 60/929,376, filed on Jun. 25, 2007.--.

In the Specification

At Column 1, Line 14, delete "27, 2007. The content of the above-identified patent docu-" and insert --25, 2007. The content of the above-identified patent docu- --.

Signed and Sealed this
Third Day of December, 2019

Andrei Iancu
*Director of the United States Patent and Trademark Office*